US011303427B2

(12) United States Patent
Kang et al.

(10) Patent No.: US 11,303,427 B2
(45) Date of Patent: Apr. 12, 2022

(54) METHOD FOR VERIFYING OPINION BY USE OF BLOCK CHAIN WHICH GUARANTEES ANONIMITY AND PREVENTS SYBIL ATTACK

(71) Applicant: Korea Smart Authentication Corp., Seoul (KR)

(72) Inventors: Joonkoo Kang, Seoul (KR); Kibong Moon, Seoul (KR); Hawon Han, Seoul (KR)

(73) Assignee: Korea Smart Authentication Corp., Seoul (KR)

( * ) Notice: Subject to any disclaimer, the term of this patent is extended or adjusted under 35 U.S.C. 154(b) by 106 days.

(21) Appl. No.: 16/911,975

(22) Filed: Jun. 25, 2020

(65) Prior Publication Data
US 2020/0328874 A1    Oct. 15, 2020

Related U.S. Application Data

(63) Continuation of application No. PCT/KR2018/002100, filed on Feb. 21, 2018.

(30) Foreign Application Priority Data

Jan. 12, 2018 (KR) .......................... 10-2018-0004249

(51) Int. Cl.
*H04L 29/06* (2006.01)
*H04L 9/00* (2022.01)

(52) U.S. Cl.
CPC .............. *H04L 9/008* (2013.01); *H04L 9/002* (2013.01); *H04L 2209/38* (2013.01)

(58) Field of Classification Search
None
See application file for complete search history.

(56) References Cited

U.S. PATENT DOCUMENTS

| 7,260,552 B2 * | 8/2007 | Riera Jorba ....... G06Q 20/3674 |
| | | 380/277 |
| 10,333,696 B2 * | 6/2019 | Ahmed .................... H04L 9/006 |

(Continued)

FOREIGN PATENT DOCUMENTS

| JP | 2012-212031 A | 11/2012 |
| JP | 2016-52047 A | 4/2016 |

(Continued)

OTHER PUBLICATIONS

Hsiao et al., "Decentralized E-Voting Systems Based on the Blockchain Technology," Advances in Computer Science and Ubiquitous Computing, pp. 305-309, 2018.

(Continued)

*Primary Examiner* — Maung T Lwin
(74) *Attorney, Agent, or Firm* — United One Law Group LLC; Kongsik Kim; Jhongwoo Peck

(57) ABSTRACT

The method of verifying an opinion includes, by an account module, receiving a request for identification information of the opinion (Ballot Stamp) from the user terminal; requesting a first random value to the user terminal; receiving a first homomorphic ciphertext from the user terminal; generating a second random value; storing a first value; generating a second homomorphic ciphertext from the Ballot Stamp; receiving a third homomorphic ciphertext obtained from a tag from an opinion verifying program module; and transmitting the second homomorphic ciphertext and the third homomorphic ciphertext to the user terminal. The method further includes, by the opinion verifying program module, receiving the tag obtained by decrypting the third homomorphic ciphertext, Ballot Stamp, and the opinion message, from the user terminal; and determining the opinion as being verified if the value calculated by the first arithmetic opera- (Continued)

tion to the random value and Ballot Stamp is identical to the tag.

10 Claims, 4 Drawing Sheets

(56) References Cited

U.S. PATENT DOCUMENTS

| | | |
|---|---|---|
| 2015/0312028 A1 | 10/2015 | Cheon et al. |
| 2017/0250796 A1* | 8/2017 | Samid .................. H04L 9/0838 |
| 2017/0352219 A1 | 12/2017 | Spanos et al. |
| 2019/0036678 A1* | 1/2019 | Ahmed .................. H04L 9/302 |
| 2019/0158272 A1* | 5/2019 | Chopra .................... H04L 9/30 |

FOREIGN PATENT DOCUMENTS

| | | |
|---|---|---|
| KR | 2003-0079867 A | 10/2003 |
| KR | 10-2010-0109001 A | 10/2010 |
| KR | 10-1205385 B1 | 11/2012 |
| KR | 10-2014-0028233 A | 3/2014 |
| KR | 10-2014-0095179 A | 8/2014 |
| KR | 10-2015-0043062 A | 4/2015 |
| KR | 10-1600016 B1 | 3/2016 |
| KR | 10-2017-0138650 A | 12/2017 |
| WO | 2014/035146 A2 | 3/2014 |

OTHER PUBLICATIONS

Shaheen et al., "Temper Proof Data Distribution for Universal Verifiability and Accuracy in Electoral Process Using Blockchain," 13th International Conference on Emerging Technologies (ICET) (2017).

* cited by examiner

METHOD FOR VERIFYING OPINION BY USE OF BLOCK CHAIN WHICH GUARANTEES ANONIMITY AND PREVENTS SYBIL ATTACK

CROSS-REFERENCE TO RELATED APPLICATIONS

This application is a Continuation application of International Application No. PCT/KR2018/002100, filed on Feb. 21, 2018, which claims priority to Korean Application No. 10-2018-0004249, filed on Jan. 12, 2018. Both applications are incorporated herein by reference in their entirety.

TECHNICAL FILED

The present disclosure relates to a method for verifying a user's opinion by use of block chain. More specifically, the present disclosure relates to the method for verifying a user's opinion, which guarantees anonymity and prevents sybil attack.

BACKGROUND

In online, there has been a lot of cases that a user provides its opinion and a receiver verifies it. Electronic voting is a representative of such cases. In addition to the electronic voting, online transactions, online contracts, online discussions, comments on online contents and the like can be the cases.

The electronic voting is conducted via an electronic terminal which is capable of electronic arithmetic operation and data processing, without voter's visiting voting place. Although the electronic voting is advantageous in terms of cost, convenience, and the wider scope of voters, it is difficult to introduce the electronic voting because there are risks of hacking, manipulation, and coercive opinion that can be caused due to remote circumstances, thereby providing little integrity in the voting process and the results thereof.

Block chain technology which is one of DLT (distributed ledger technology) can prevent the manipulation or hacking if it is applied to the electronic voting. However, because any one having a public key and a secret key can access block chain, one person can generate a large number of IDs and manipulate the voting results by misleading the opinion of the one person as being opinions of many users, also known as "sybil attack", thereby destroying the equality of providing user's opinion.

For preventing the sybil attack, the user should be uniquely specified. Accordingly, a private information of specifying the user should be collected for guaranteeing the uniqueness. This may compromise the privacy and anonymity of the user, thereby restricting expression of free opinion. According to the present disclosure, anonymity as well as uniqueness can be guaranteed by use of homomorphic encryption which is capable of arithmetic operation of ciphertexts.

SUMMARY

The object of the present disclosure is to provide a method of verifying opinions wherein the advantages of online opinions are maintained; the disadvantages such as forgery, falsification and coercive opinion are prevented; anonymity is guaranteed; sybil attack is basically blocked; and a user can make sure that its opinion is properly reflected in the decision.

The computer-implemented method of the present disclosure, for verifying an opinion of a user is carried out in an environment including a terminal of a user who has unique identification information ($ID_E$) generated by a process of verifying identification; and a block chain including an account module and an opinion verifying program module.

The method of the present disclosure comprises a first step of receiving, by the account module, a request for identification information of the opinion (Ballot Stamp) from the user terminal; a second step of requesting, by the account module, a first random value ($R_E$) to the user terminal; a third step of receiving, by the account module, a first homomorphic ciphertext ($HE_{SK}(R_E)$) which is a value of homomorphically encrypting the first random value ($R_E$), from the user terminal; a fourth step of generating, by the account module, a second random value ($R_A$); a fifth step of storing, by the account module, a first value which is [the second random value ($R_A$), the first homomorphic ciphertext ($HE_{SK}(R_E)$)]; a sixth step of generating, by the account module, a second homomorphic ciphertext which is a value of homomorphically encrypting the Ballot Stamp, the second homomorphic ciphertext being one-way encrypting value of the value including first value or being a value of XOR operation to the value including the first value; a seventh step of receiving, by the account module, a third homomorphic ciphertext (HE(tag)) which is a value of homomorphically encrypting a tag, from the opinion verifying program module, the third homomorphic ciphertext (HE(tag)) being calculated by a first arithmetic operation to a random value generated by the opinion verifying program module and the second homomorphic ciphertext (HE(Ballot Stamp)); an eighth step of transmitting, by the account module, the second homomorphic ciphertext (HE(Ballot Stamp)) and the third homomorphic ciphertext (HE(tag)), to the user terminal; a ninth step of receiving, by the opinion verifying program module, the tag which is obtained by decrypting the third homomorphic ciphertext, Ballot Stamp, and the opinion message, from the user terminal; and a tenth step of determining, by the opinion verifying program module, the opinion as being verified if the value calculated by the first arithmetic operation to the random value and Ballot Stamp is identical to the tag.

The first value can further include at least one of the identification information of the account module ($ID_A$) and the identification information of the opinion verifying program module ($ID_V$).

The method of the present disclosure can further comprise a step of requesting, by the account module, a session for the second homomorphic ciphertext to the opinion verifying program module, between the sixth step and the seventh step. The account module can further receive the session identification information from the opinion verifying program module in the seventh step; and the account module further transmits the session identification information to the user terminal.

The random value can comprise a third random value and a fourth random value. The first arithmetic operation can include at least an operation of [one of the third random value and the fourth random value×a predetermined value±the other one of the third random value and the fourth random value].

The predetermined value can be a second homomorphic ciphertext (HE(Ballot Stamp)).

The first arithmetic operation can be XOR operation to the random value and the second homomorphic ciphertext.

According to the present disclosure, the advantages of online communication such as convenience, low cost, effectiveness and the like can be maintained; forgery, falsification, coercive opinion and sybil attack are prevented; and anonymity is guaranteed. Further, the present disclosure provides a flexibility of correcting errors and changing wrong decision, thereby making an opinion more reliable and more accurate.

BRIEF DESCRIPTION OF THE DRAWINGS

The present disclosure will be more fully understood from the following detailed description taken in conjunction with the accompanying drawings.

Figure 1:
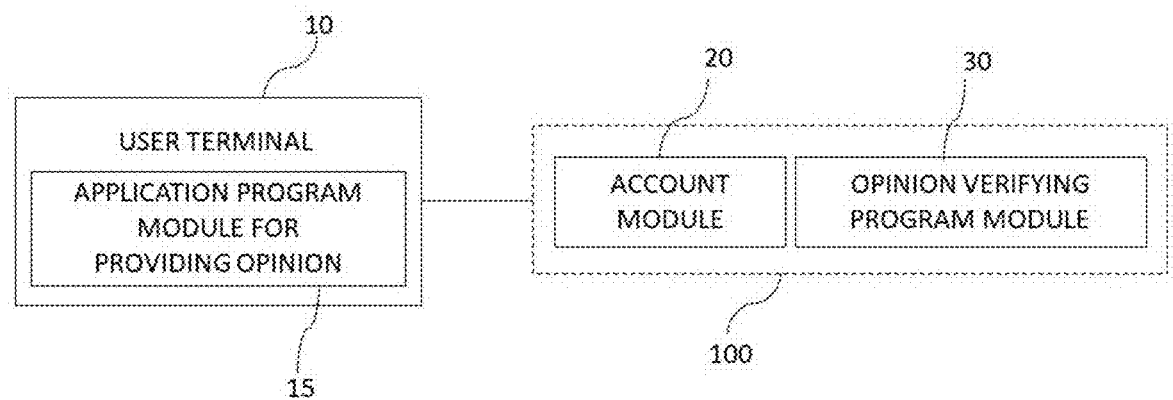
FIG. 1 is a block diagram showing an environment where the method for verifying user's opinion according to the present disclosure is carried out.

It should be understood that the above-referenced drawings are not necessarily to scale, presenting a somewhat simplified representation of various preferred features illustrative of the basic principles of the disclosure. The specific design features of the present disclosure will be determined in part by the particular intended application and use environment.

DETAILED DESCRIPTION

Hereinafter, the present disclosure will be described in detail with reference to the accompanying drawings.

In this specification, transmitting/receiving of information (data) can be carried out with encryption/decryption if necessary. It should be understood that transmitting/receiving described in this specification can be carried out with encryption/decryption although not specifically mentioned. Further, transmitting (forwarding) to B from A or receiving by A from B include the process via an additional medium, not limited to direct transmitting or receiving. The order of each step should be understood in a non-limited manner unless a preceding step must be performed logically and temporally before a following step. That is, except for the exceptional cases as described above, although a process described as a following step is preceded by a process described as a preceding step, it does not affect the nature of the present disclosure, and the scope of rights should be defined regardless of the order of the steps. In addition, in this specification, "A or B" is defined not only as selectively referring to either A or B, but also as including both A and B. In addition, in this specification, the term "comprise" has a meaning of further including other components in addition to the components listed.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The method according to the present disclosure can be carried out by an electronic arithmetic device such as a computer, tablet, mobile phone, portable computing device, stationary computing device, etc. Additionally, it is understood that one or more various methods, or aspects thereof, may be executed by at least one processor. The processor may be implemented on a computer, tablet, mobile device, portable computing device, etc. A memory configured to store program instructions may also be implemented in the device(s), in which case the processor is specifically programmed to execute the stored program instructions to perform one or more processes, which are described further below. Moreover, it is understood that the below information, methods, etc. may be executed by a computer, tablet, mobile device, portable computing device, etc. including the processor, in conjunction with one or more additional components, as described in detail below. Furthermore, control logic may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 4:
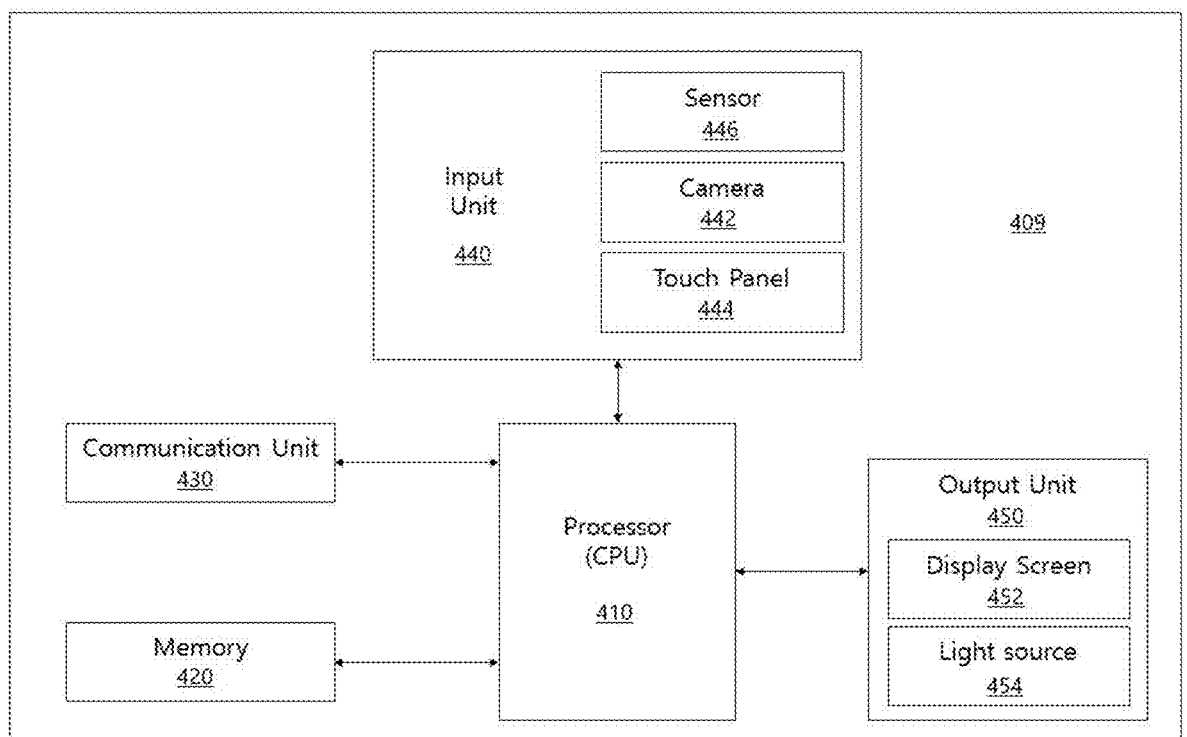
FIG. 4 is one embodiment of an example diagrammatic view of a device architecture which carries out the present disclosure.

A variety of devices can be used herein. FIG. 4 illustrates an example diagrammatic view of an exemplary device architecture according to embodiments of the present disclosure. As shown in FIG. 4, a device (409) may contain multiple components, including, but not limited to, a processor (e.g., central processing unit (CPU; 410), a memory (420), a wired or wireless communication unit (430), one or more input units (440), and one or more output units (450). It should be noted that the architecture depicted in FIG. 4 is simplified and provided merely for demonstration purposes. The architecture of the device (409) can be modified in any suitable manner as would be understood by a person having ordinary skill in the art, in accordance with the present claims. Moreover, the components of the device (409) themselves may be modified in any suitable manner as would be understood by a person having ordinary skill in the art, in accordance with the present claims. Therefore, the device architecture depicted in FIG. 4 should be treated as exemplary only and should not be treated as limiting the scope of the present disclosure.

The processor (410) is capable of controlling operation of the device (409). More specifically, the processor (410) may be operable to control and interact with multiple components installed in the device (409), as shown in FIG. 4. For instance, the memory (420) can store program instructions that are executable by the processor (410) and data. The process described herein may be stored in the form of program instructions in the memory (420) for execution by the processor (410). The communication unit (430) can allow the device (409) to transmit data to and receive data from one or more external devices via a communication network. The input unit (440) can enable the device (409) to receive input of various types, such as audio/visual input, user input, data input, and the like. To this end, the input unit (440) may be composed of multiple input devices for accepting input of various types, including, for instance, one or more cameras (442) (i.e., an "image acquisition unit"), touch panel (444), microphone (not shown), sensors (446), keyboards, mice, one or more buttons or switches (not shown), and so forth. The term "image acquisition unit," as used herein, may refer to the camera (442), but is not limited thereto. The input devices included in the input (440) may be manipulated by a user. The output unit (450) can display information on the display screen (452) for a user to view. The display screen (452) can also be configured to accept one or more inputs, such as a user tapping or pressing the screen (452), through a variety of mechanisms known in the art. The output unit (450) may further include a light source (454). The device (409) is illustrated as a single component, but the device may also be composed of multiple, separate components that are connected together and interact with each other during use.

The device (409) can thus be programmed in a manner allowing it to carry out the steps and/or processes of the present disclosure.

The term "module" or "unit" means a logical combination of a universal hardware and a software carrying out required function.

In this specification, the essential elements for the present disclosure will be described and the non-essential elements may not be described. However, the scope of the present disclosure should not be limited to the invention including only the described components. Further, the invention which includes additional element or does not have non-essential elements can be within the scope of the present disclosure.

The present disclosure can be carried out by an electronic arithmetic device such as a computer. The arithmetic operation and calculation which will be described hereinafter can be carried out by the known computing codes for the operation or calculation, or the computing codes which is appropriately conceived for the present disclosure.

The term "value" described in this specification is defined as being universal value which includes vector, matrix, tensor and polynomial as well as scholar value.

The term "opinion" described in this specification can relate to a user's opinion about a predetermined subject or issue, for example, electronic voting, discussion, comments to online contents and the like.

Further, the opinion can be a plurality of opinions that a user provides about the same subject or issue as well as a single opinion about the subject or issue.

FIG. 1 shows an environment where the method for verifying opinion according to the present disclosure is carried out.

The environment comprises a user terminal (10) including an application program module (15) and a block chain (100). An account module (20) and a program module (30) for verifying opinion can be included in the block chain (100).

The present disclosure is carried out in the environment including block chain, thereby basically blocking forgery and falsification.

The user terminal (10) can be a PC, a tablet computer, a smartphone and the like which carries out electronic arithmetic operation and data processing. It should be understood that the steps which are described as being carried out by the user terminal are actually carried out by the application program module (15) which is installed in the user terminal (10), although a portion of the steps of the present disclosure can be carried out by the other parts of the user terminal (10).

A unique identification information ($ID_E$) for a user should be previously generated by a known process for verifying identification of the user, such as KYC process. For example, the identification information ($ID_E$) which is uniquely given to a specific user and is non-overlapping with other users should be generated by verifying identification card and/or biometric authentication and then is stored in the user terminal. Alternatively, the user can input the identification information to the user terminal. Because the process for verifying identification such as KYC process is well known and the identification information ($ID_E$) can be generated by various known other ways, the process for verifying identification will not be described in detail in this specification.

The user terminal (10) can use a secret key for the homomorphic encryption which will be described in the below. The secret key can be stored in the user terminal (10) or in a recording medium or security token which is physically separated from the user terminal (10). Alternatively, the secret key can be stored in a remote recording medium which can communicate via network with the user terminal (10). The secret key can be stored in wherever the user terminal (10) can use it for accomplishing the object of the present disclosure.

The block chain (100) of the environment where the method for verifying opinion according to the present disclosure is carried out is preferred to be a public block chain. However, if the present disclosure is carried out within a specific institution or organization, the block chain can be private block chain or consortium block chain.

Unique identification information ($ID_A$) is given for each account module. The account module is generated for each user identification information ($ID_E$) and then is included in the block chain.

Opinion verifying program module (30) is provided for each subject. Unique identification information ($ID_V$) is given for each opinion verifying program module. The opinion verifying program module is included in the block chain. The opinion verifying program module can be provided for each ongoing voting when the present disclosure is applied to an electronic voting. The opinion verifying program module can be provided for each agenda of discussion when the present disclosure is applied to an online discussion.

Figure 2:
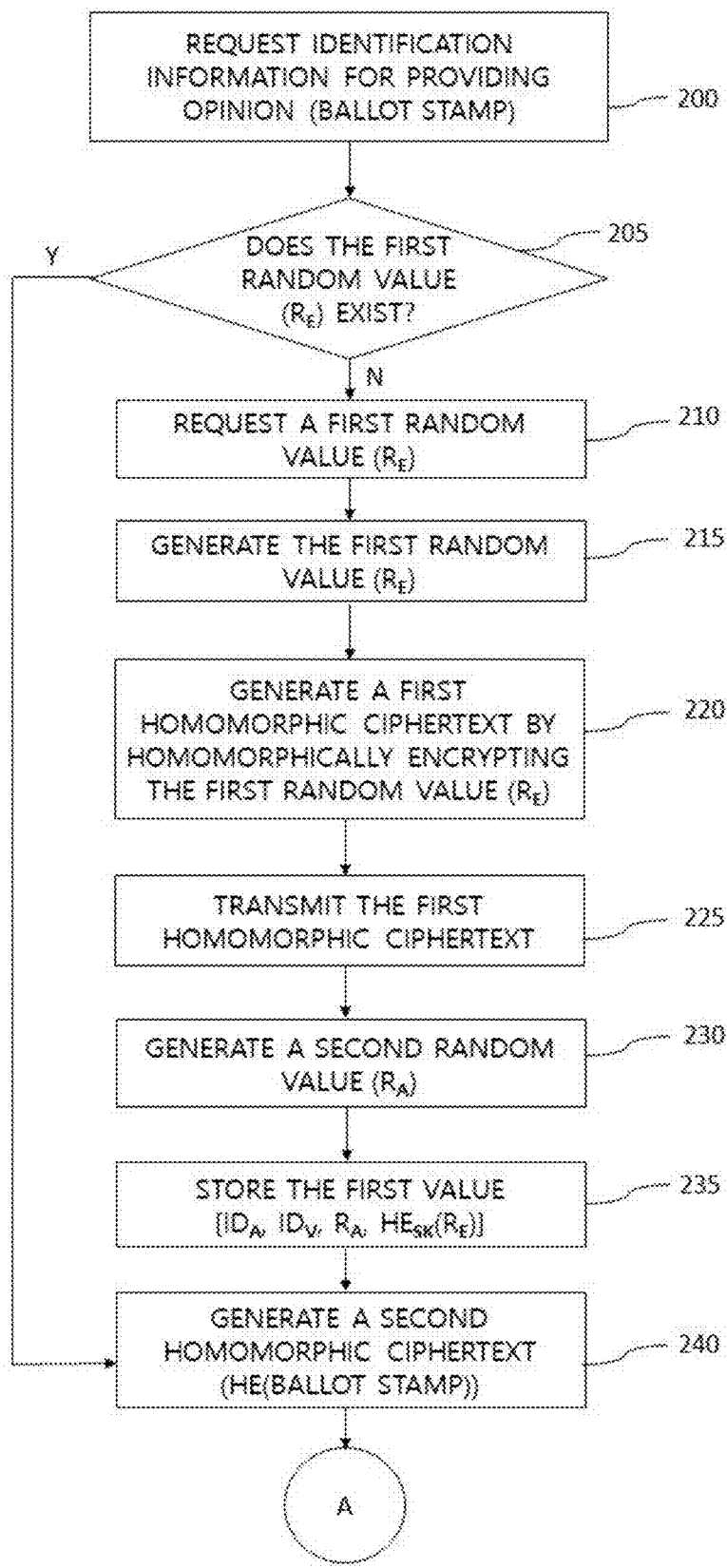
FIGS. 2 and 3 are flow charts of the method of the present disclosure.
Figure 3:
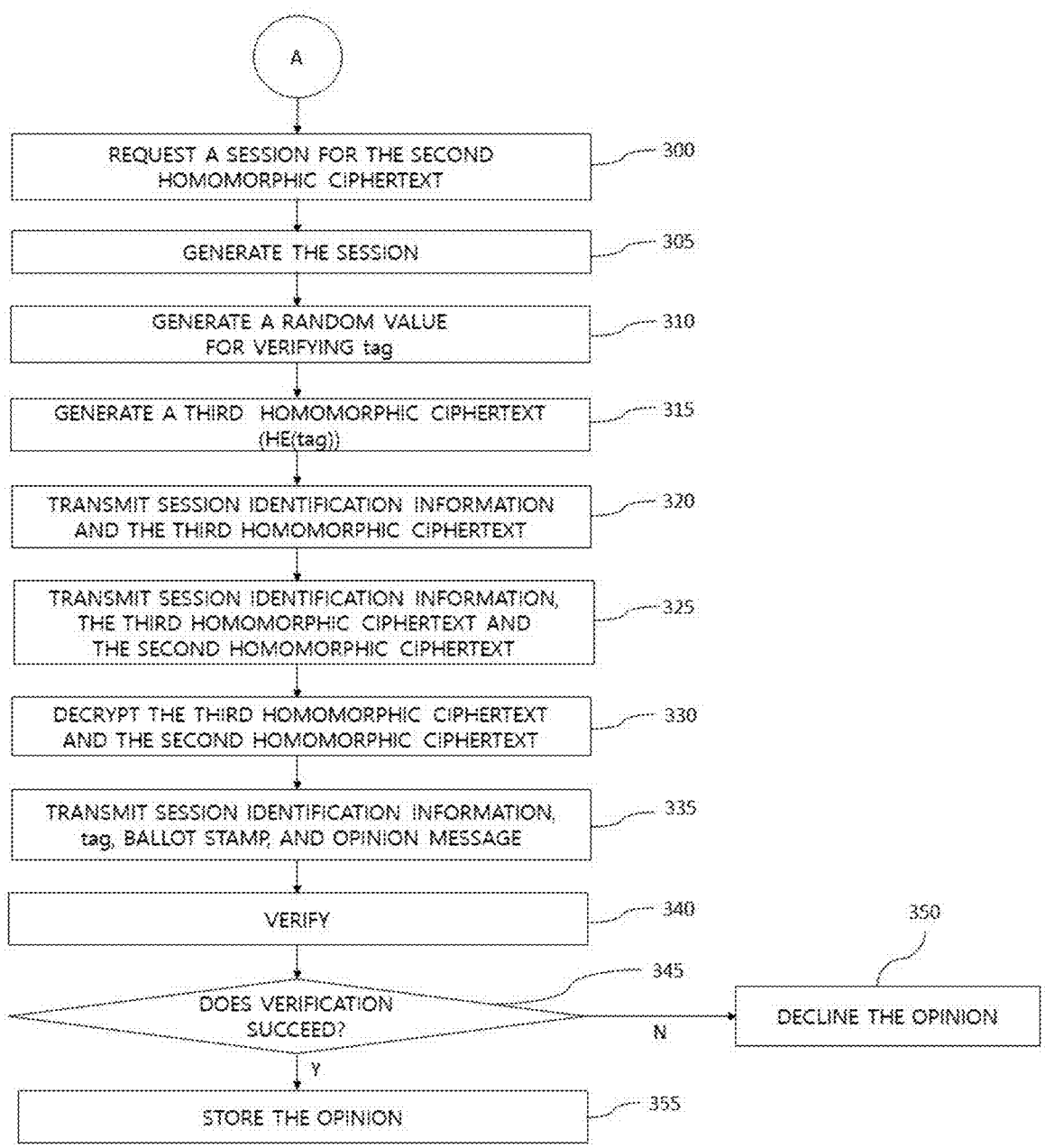

The opinion verifying method according to the present disclosure will be described with reference to FIGS. 2 and 3. The process of FIG. 3 follows the process of FIG. 2.

The user who has the unique identification information ($ID_E$) generated by a known method of verifying identification such as KYC process, requests Ballot stamp (identification information for an opinion) to the account module (20) via the user terminal (10) where the application program module (15) is installed (Step 200). When the user requests the Ballot stamp, the identification information of the account module ($ID_A$) and the identification information of the program module ($ID_V$) can be specified.

In the step (205), the account module (20) determines whether a first random value ($R_E$) exists. If the first random value ($R_E$) exists, the step (240) is carried out.

If the first random value ($R_E$) does not exist, the account module (20) requests the first random value ($R_E$) to the user terminal (10) in the step (210).

The existence of first random value ($R_E$) means that the user has provided its opinion via the account module (20) earlier.

The user terminal (10) generates the first random value ($R_E$) in the step (215) and then generates the first homomorphic ciphertext of the first random value ($R_E$) ($HE_{SK}(R_E)$) by use of a secret key (Step 220). In the step (225), the first homomorphic ciphertext ($HE_{SK}(R_E)$) is transmitted to the account module (20).

The first homomorphic ciphertext ($HE_{SK}(R_E)$) is stored in the account module (20) and is used for detecting whether the user provides its opinion in a plurality of times thereafter.

In the event that the user provides its opinion in a plurality of times, it can be regulated that only the first opinion is accepted and the opinions thereafter are ignored. Alternatively, it can be regulated that the last opinion is accepted and the earlier opinions are ignored. Otherwise, it can be regulated that all of the opinions are accepted. For example, in the event that the present disclosure is applied to an electronic voting, it is preferred that only one opinion is accepted even though a user provides its opinion in a plurality of times. In the event that the present disclosure is applied to a discussion, all opinions that a user provides in a plurality of times can be accepted.

The first homomorphic ciphertext ($HE_{SK}(R_E)$) exists in the case wherein only the last opinion is accepted among the opinions provided in a plurality of times; in the case wherein the user generated the first homomorphic ciphertext ($HE_{SK}(R_E)$) but has not provided its opinion as yet; or in the case wherein all of the opinions which have been provided in a plurality of times are accepted. In that cases, the step (240) is carried out.

The account module (20) generates a second random value ($R_A$) in the step (230). Because the first homomorphic ciphertext ($HE_{SK}(R_E)$) which is received by the account module (20) in the step (225) is a homomorphically encrypted value, the randomness of the first random value ($R_E$) cannot be verified. Therefore, it is preferred that the second random value ($R_A$) is further generated in order to guarantee the randomness of the Ballot Stamp which is generated as described in the below.

The account module (20) stores in the step (235) the first value which is [identification information of account module ($ID_A$), identification information of program module ($ID_V$), the second random value ($R_A$), the first homomorphic ciphertext ($HE_{SK}(R_E)$)].

Any one of identification information of account module ($ID_A$) and identification information of program module ($ID_V$) can be removed from the first value since they are specified in the process of the present disclosure. The embodiments where the both of the identification information is included in the first value will be described in the below. However, it should be understood that the scope of the present disclosure is not limited to the embodiments.

In the step (240), the account module (20) generates one-way ciphertext "Hash[$ID_A$, $ID_V$, $R_A$, $HE_{SK}(R_E)$]" as the homomorphic ciphertext (HE(Ballot Stamp)) of the Ballot Stamp. The homomorphic ciphertext of the Ballot Stamp is defined as "the second homomorphic ciphertext." The second homomorphic ciphertext (HE(Ballot Stamp)) satisfies the following relationship:

$$HE(\text{Ballot Stamp})=Hash[ID_A,ID_V,R_A,HE_{SK}(R_E)]=HE[Hash[ID_A,ID_V,R_A,R_E]]$$

In the embodiments where $ID_A$ and $ID_V$ are excluded, the following relationship is satisfied:

$$HE(\text{Ballot Stamp})=Hash[R_A,HE_{SK}(R_E)]=HE[HASH(R_A,R_E)]$$

In the embodiments where one of $ID_A$ and $ID_V$ is excluded, the other is included in the above equation.

Any one-way encryption operation wherein the same input results in the same output but the input cannot be calculated from the output can be used in the step (240).

Alternatively, XOR operation can be used in the step (240) instead of the one-way encryption operation. In that case, security level can be lowered compared with using one-way encryption operation.

In the embodiments using XOR operation, the following relationship is satisfied:

$$HE(\text{Ballot Stamp})=XOR[R_A,HE_{SK}(R_E)]=HE[XOR(R_A,R_E)]$$

In the step (300), the account module (20) requests a session for the second homomorphic ciphertext to the opinion verifying program module (30).

In the step (305), the opinion verifying program module (30) generates the session for the second homomorphic ciphertext (HE(Ballot Stamp)).

In the step (310), the opinion verifying program module (30) generates a random value for verifying a tag. The random value can be generated as a single value or plural values.

In the step (315), the opinion verifying program module (30) generates the homomorphic ciphertext of the tag (HE(tag)) which is calculated by an arithmetic operation of the random values and the second homomorphic ciphertext (HE(Ballot Stamp)). HE(tag) is defined as "the third homomorphic ciphertext." Any arithmetic operation can be used if tag cannot be inferred from the Ballot Stamp when the random value is unknown and homomorphic encryption operation can be carried out.

For example, the following arithmetic operation can be used:

$$HE(\text{tag})=R_{V1}*HE(\text{Ballot Stamp})+R_{V2} \text{ where } R_{V1} \text{ is the third random value and } R_{V2} \text{ is the fourth random value}$$

Thus, the following relationships are satisfied:

$$R_{V1}*HE(\text{Ballot Stamp})+R_{V2}=HE(R_{V1}*\text{Ballot Stamp}+R_{V2})=HE(\text{tag})$$

Therefore, tag=$R_{V1}$*Ballot Stamp+$R_{V2}$

That is, the arithmetic relationship maintains between the decrypted Ballot Stamp and the tag.

According to another embodiments, XOR operation can be used as follows:

$$XOR(R_{V1},HE(\text{Ballot Stamp}))=HE(XOR(R_{V1},\text{Ballot Stamp}))=HE(\text{tag})$$

$$\text{tag}=XOR(R_{V1},\text{Ballot Stamp})$$

In the step (320), the opinion verifying program module (30) transmits the session identification information (IDs) and the third homomorphic ciphertext (HE(tag)) to the account module (20).

In the step (325), the account module (20) transmits the session identification information (IDs), the third homomorphic ciphertext (HE(tag)) and the second homomorphic ciphertext (HE(Ballot Stamp)) to the user terminal (10).

In the step (330), the user terminal (10) decrypts the second homomorphic ciphertext (HE(Ballot Stamp)) and the third homomorphic ciphertext (HE(tag)).

In the step (335), the user terminal (10) transmits the session identification information (IDs), the tag which is obtained by the decryption, the Ballot Stamp, and Message in connection with its opinion (for example, Voting Result in case of vote) to the opinion verifying program module (30).

The identification information of the opinion (Ballot Stamp) should not be exposed to the object, for example, the account module (20) other than the opinion verifying program module (30). Thus, it is preferred that the transmission in the step (335) is carried out through the communication channel which is physically separated or through encryption channel.

If the third homomorphic ciphertext (HE(tag)) is generated by the above-mentioned arithmetic operation, the tag is also generated by the operation of the random value(s) and Ballot Stamp.

For example, if the operation is "HE(tag)=$R_{V1}$*HE(Ballot Stamp)+$R_{V2}$," the tag equals to "$R_{V1}$*Ballot Stamp+$R_{V2}$."

If the operation is "HE(tag)=XOR($R_{V1}$, HE(Ballot Stamp))," tag equals to XOR($R_{V1}$, Ballot Stamp).

In the step (340), the opinion verifying program module (30) verifies the opinion by use of the arithmetic operation of the tag received from the user terminal (10); Ballot Stamp; and the random value generated in the step (310).

If it is determined that the verification succeeds in the step (345), the opinion is regarded as being verified and is stored in the step (355). If not, the opinion is declined in the step (350).

Although the present disclosure has been described with reference to accompanying drawings, the scope of the present disclosure is determined by the claims described below and should not be interpreted as being restricted by the embodiments and/or drawings described above. It should be clearly understood that improvements, changes and modifications of the present disclosure disclosed in the claims and apparent to those skilled in the art also fall within the scope of the present disclosure.

What is claimed is:

1. A computer-implemented method of verifying an opinion of a user, which is carried out in an environment including a terminal of a user who has unique identification information ($ID_E$) generated by a process of verifying identification; and a block chain including an account module and an opinion verifying program module, the method comprising:

a first step of receiving, by the account module, a request for identification information of the opinion (Ballot Stamp) from the user terminal;

a second step of requesting, by the account module, a first random value ($R_E$) to the user terminal;

a third step of receiving, by the account module, a first homomorphic ciphertext ($HE_{SK}(R_E)$) which is a value of homomorphically encrypting the first random value ($R_E$), from the user terminal;

a fourth step of generating, by the account module, a second random value ($R_A$);

a fifth step of storing, by the account module, a first value which is [the second random value ($R_A$), the first homomorphic ciphertext ($HE_{SK}(R_E)$)];

a sixth step of generating, by the account module, a second homomorphic ciphertext which is a value of homomorphically encrypting the Ballot Stamp, the second homomorphic ciphertext being one-way encrypting value of the value including first value or being a value of XOR operation to the value including the first value;

a seventh step of receiving, by the account module, a third homomorphic ciphertext (HE(tag)) which is a value of homomorphically encrypting a tag, from the opinion verifying program module, the third homomorphic ciphertext (HE(tag)) being calculated by a first arithmetic operation to a random value generated by the opinion verifying program module and the second homomorphic ciphertext (HE(Ballot Stamp));

an eighth step of transmitting, by the account module, the second homomorphic ciphertext (HE(Ballot Stamp)) and the third homomorphic ciphertext (HE(tag)), to the user terminal;

a ninth step of receiving, by the opinion verifying program module, the tag which is obtained by decrypting the third homomorphic ciphertext, Ballot Stamp, and the opinion message, from the user terminal; and a tenth step of determining, by the opinion verifying program module, the opinion as being verified if the value calculated by the first arithmetic operation to the random value and Ballot Stamp is identical to the tag.

2. The computer-implemented method of claim 1, wherein the first value further includes at least one of the identification information of the account module ($ID_A$) and the identification information of the opinion verifying program module ($ID_P$).

3. The computer-implemented method of claim 2, further comprising:

a step of requesting, by the account module, a session for the second homomorphic ciphertext to the opinion verifying program module, between the sixth step and the seventh step, wherein the account module further receives the session identification information from the opinion verifying program module in the seventh step; and the account module further transmits the session identification information to the user terminal.

4. The computer-implemented method of claim 2, wherein the random value comprises a third random value and a fourth random value; and the first arithmetic operation includes at least an operation of [one of the third random value and the fourth random value×a predetermined value±the other one of the third random value and the fourth random value].

5. The computer-implemented method of claim 4, wherein the predetermined value is a second homomorphic ciphertext (HE(Ballot Stamp)).

6. The computer-implemented method of claim 2, wherein the first arithmetic operation is XOR operation to the random value and the second homomorphic ciphertext.

7. The computer-implemented method of claim 1, further comprising:

a step of requesting, by the account module, a session for the second homomorphic ciphertext to the opinion verifying program module, between the sixth step and the seventh step, wherein the account module further receives the session identification information from the opinion verifying program module in the seventh step; and the account module further transmits the session identification information to the user terminal.

8. The computer-implemented method of claim 1, wherein the random value comprises a third random value and a fourth random value; and the first arithmetic operation includes at least an operation of [one of the third random value and the fourth random value×a predetermined value±the other one of the third random value and the fourth random value].

9. The computer-implemented method of claim 8, wherein the predetermined value is a second homomorphic ciphertext (HE(Ballot Stamp)).

10. The computer-implemented method of claim 1, wherein the first arithmetic operation is XOR operation to the random value and the second homomorphic ciphertext.

\* \* \* \* \*